United States Patent
Gaudet et al.

(10) Patent No.: US 10,542,430 B2
(45) Date of Patent: Jan. 21, 2020

(54) QUORUM-BASED SECURE AUTHENTICATION

(71) Applicants: Edward J. Gaudet, Hanover, MA (US); David M. T. Ting, Sudbury, MA (US)

(72) Inventors: Edward J. Gaudet, Hanover, MA (US); David M. T. Ting, Sudbury, MA (US)

(73) Assignee: IMPRIVATA, INC., Lexington, MA (US)

( * ) Notice: Subject to any disclaimer, the term of this patent is extended or adjusted under 35 U.S.C. 154(b) by 368 days.

(21) Appl. No.: 15/392,337

(22) Filed: Dec. 28, 2016

(65) Prior Publication Data

US 2017/0142579 A1    May 18, 2017

Related U.S. Application Data

(63) Continuation of application No. 13/859,894, filed on Apr. 10, 2013, now Pat. No. 9,572,029.

(60) Provisional application No. 61/622,161, filed on Apr. 10, 2012.

(51) Int. Cl.
| | | |
|---|---|---|
| *H04W 12/04* | (2009.01) | |
| *H04W 12/06* | (2009.01) | |
| *H04L 29/06* | (2006.01) | |
| *H04W 4/80* | (2018.01) | |

(52) U.S. Cl.
CPC ......... *H04W 12/06* (2013.01); *H04L 63/061* (2013.01); *H04L 63/0853* (2013.01); *H04L 63/10* (2013.01); *H04W 12/04* (2013.01); *H04W 4/80* (2018.02)

(58) Field of Classification Search
None
See application file for complete search history.

(56) References Cited

U.S. PATENT DOCUMENTS

| | | |
|---|---|---|
| 6,775,668 B1 | 8/2004 | Goel |
| 6,980,983 B2 | 12/2005 | Banerjee |
| 7,552,321 B2 | 6/2009 | Rockwood et al. |
| 7,606,560 B2 | 10/2009 | Labrou |
| 7,631,810 B2 | 12/2009 | Liu et al. |
| 8,028,896 B2 | 10/2011 | Carter et al. |
| 8,046,257 B2 | 10/2011 | Wane et al. |
| 8,090,351 B2 | 1/2012 | Klein |
| 8,111,134 B2 | 2/2012 | Faith et al. |
| 8,131,214 B2 | 3/2012 | Braun et al. |

(Continued)

FOREIGN PATENT DOCUMENTS

| | | |
|---|---|---|
| EP | 2182493 A1 | 5/2010 |
| EP | 2221984 A1 | 8/2010 |
| WO | WO-2009071734 A1 | 6/2009 |

*Primary Examiner* — William J. Goodchild
(74) *Attorney, Agent, or Firm* — Morgan, Lewis & Bockius LLP (57) ABSTRACT

Representative embodiments of secure authentication to a resource in accordance with a predefined, electronically stored quorum-based authentication policy include causing electronic interaction among multiple devices that constitute a quorum in accordance with the policy, computationally determining whether the interaction satisfies the policy, and if so, electronically according access to the resource to one or more individuals associated with the interacting device(s).

16 Claims, 5 Drawing Sheets

(56) References Cited

U.S. PATENT DOCUMENTS

| | | |
|---|---|---|
| 8,285,825 B1 | 10/2012 | Nagaraj |
| 8,850,527 B2 | 9/2014 | Chew |
| 2001/0016911 A1* | 8/2001 | Obana .................. H04L 9/3255 713/180 |
| 2006/0041759 A1* | 2/2006 | Kaliski, Jr. ............. G06F 21/31 713/184 |
| 2006/0293028 A1 | 12/2006 | Gadamsetty |
| 2007/0261103 A1* | 11/2007 | Viavant .................. G06F 21/40 726/2 |
| 2008/0239357 A1* | 10/2008 | Matsushima .......... G03G 21/02 358/1.13 |
| 2008/0244714 A1 | 10/2008 | Kulakowski |
| 2009/0204815 A1 | 8/2009 | Dennis et al. |
| 2010/0088749 A1 | 4/2010 | Steeples |
| 2010/0293613 A1 | 11/2010 | Hum |
| 2011/0103586 A1 | 5/2011 | Nobre |
| 2011/0117966 A1 | 5/2011 | Coppinger |
| 2011/0270757 A1 | 11/2011 | Hammad |
| 2011/0313922 A1 | 12/2011 | Ben Ayed |
| 2012/0227092 A1 | 9/2012 | Smith |

\* cited by examiner

QUORUM-BASED SECURE AUTHENTICATION

CROSS-REFERENCE TO RELATED APPLICATION

This application is a continuation of U.S. patent application Ser. No. 13/859,894, filed Apr. 10, 2013, which claims priority to, and the benefit of, U.S. Provisional Application Ser. No. 61/622,161, filed on Apr. 10, 2012, the entire disclosure of each of which is hereby incorporated by reference.

FIELD OF THE INVENTION

In various embodiments, the present invention relates generally to computer security and, more specifically, to the authentication of users for purposes of resource access using near-field communications.

BACKGROUND

Computer security in a shared environment—e.g., healthcare or manufacturing—is essential for preventing unauthorized intruders from accessing sensitive or classified information and data within the computer system. Authentication is the act of accepting proof of identity given by a trusted person; such proof may be based on one or more of three unique factors: something the person knows (e.g, a password or PIN); something the person has (e.g., a badge, token or cell phone); or something the person is (e.g., a biometric indicium such as a fingerprint). Very high security requirements may include the concept of a "mantrap"—i.e., a physical space bounded by different sets of doors arranged such that one set of doors must close before the next set can open. Different factors of authentication are usually required through each door or authentication gate.

This notion of requiring performance of sequential actions for authentication may be replicated electronically through quorum-based schemes. In such approaches, authentication requires the presence of, or actions taken by, a threshold number of members of a defined group. For example, one or more access sets, each containing a threshold number of group members, may be defined. The group members may split a quorum private key, in which case the shares of the quorum private key for each group member in all access sets are specified. The shares of the private key held by the group members in any one access set add up to a number directly related to the private key. See, e.g., U.S. Pat. No. 7,136,489.

Conventional quorum-based approaches are limited, however, in that group members must ordinarily, and independently, perform some physical action to manifest their presence and identify themselves. Moreover, that activity generally involves separate communication between each group member and a central authentication server. These requirements limit the appeal and adoption of quorum-based authentication systems.

SUMMARY

In various embodiments, the present invention relates to quorum-based authentication involving a group of quorum-related members acting sequentially or substantially simultaneously prior to establishing communications with a central authentication server. For example, each quorum-related group member may possess an identifier or an encryption key; a collection of the identifiers/encryption keys is used to generate a signature or a private key that can be verified by the server, causing the server to provide one or more group members with access to a desired resource. Because the authentication server grants access based on the integrity of the group of assembled identifiers/encryption keys, a single malicious "hack" from a compromised system of one group member will not circumvent the security and access to the secured resource will be denied; this approach thus creates a highly secure authentication system. In addition, there is no need for each individual to communicate with the central authentication server separately; this obviates the need for multiple individual authentication processes between the quorum-related members and the central server, thereby minimizing authentication steps and significantly reducing authentication time.

In various embodiments, each quorum-related group member interacts with other members, utilizing, for example, a mobile device, e.g., a "smart phone" or tablet; this allows the quorum members to perform an authentication procedure locally or globally. In one implementation, the mobile device is equipped with near-field communication (NFC) capabilities and can read information (e.g., an identifier) from other similarly equipped mobile devices within a short-distance RF activation range to create an assembled signature/encryption key. Alternatively, the mobile device may receive and transmit each group member's identifier/encryption key via point-to-point Bluetooth communications, wireless cell phone communications and/or Wi-Fi LANs. Once the collective identifiers/encryption keys are assembled and an integrated signature or private key has been generated, one of the group members may transmit this signature or private key to the central server to request access to the desired resource using any bi-directional communication and data transfer. Because mobile devices enable various communications between the group members, the group members required to perform the authentication process may be geographically distributed among different locations or physically present at the same location.

Accordingly, in one aspect, the invention pertains to a method of secure authentication to a resource in accordance with a predefined, electronically stored quorum-based authentication policy. In various embodiments, the method includes the steps of causing electronic interaction among multiple devices each associated with a user thereof, where the devices constitute a quorum in accordance with the policy; computationally determining whether the interaction satisfies the policy; and if so, electronically according access to the resource to one or more individuals associated with the interacting device(s). In one implementation, the interaction includes NFC interaction and the devices include NFC nodes. In some embodiments, the interaction is performed pairwise.

In one embodiment, the policy specifies an order of interaction, in which case the communication may include an indicium (e.g., an encryption key) of the interaction among the NFC nodes including the order thereof. In other embodiments, the policy does not require an order of interaction.

The step of according access may be accomplished by an authentication server and may include wirelessly communicating, from the authentication server, an authorization directly to a device capable of facilitating access to the resource. In addition, the method may further include identifying the resource using information transmitted from the interacting device(s).

In another aspect, the invention relates to an authentication server. In various embodiments, the server includes a database for storing a quorum-based authentication policy for access to a secured resource, identifiers associated with users entitled to access the secured resource, and identifiers associated with multiple mobile devices that are themselves associated with the users; a communication module for receiving, from one or more mobile devices, an indicium indicating one or more interactions among the multiple mobile devices; and a processor configured to determine whether (i) the multiple mobile devices constitute a quorum in accordance with the stored policy and (ii) whether the interaction satisfies the policy, and if so, to cause one or more individuals associated with the mobile device(s) to be accorded access to the secured resource.

The communication module may be configured to wirelessly communicate an authorization directly to a device capable of facilitating access to the secured resource. In some embodiments, the communication module is configured to wirelessly communicate with the mobile devices via cell phone communications. For example, the communication module may be configured to transmit the stored policy to the mobile device(s), thereby causing the interaction(s) among the multiple mobile devices.

In various embodiments, the policy specifies an order of interaction, and the processor is configured to determine whether interactions among the multiple mobile devices satisfy the order. In one embodiment, the indicium is an encryption key and the processor is configured to decrypt the encryption key.

Still another aspect of the invention relates to a wireless mobile device. In some embodiments, the mobile device includes a processor for executing a first procedure for communicating with one or more other wireless mobile device(s); executing a second procedure for creating an indicium indicative of the communication; executing a third procedure for reading an identifying tag associated with a device capable of facilitating access to a resource; and executing a fourth procedure for transmitting the indicium, information from the identifying tag and information identifying the wireless mobile device to a server.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The terms "substantially" and "approximately" mean within ±10% of device interaction time and, in some embodiments, within ±5% of device interaction time. The term "electronic," used in connection with an action (such as storage, interaction, etc.), broadly connotes actions taken via a wired connection, wirelessly (e.g., using radiofrequency (RF) or other band of the electromagnetic spectrum), optically, or otherwise involving analog or digital equipment. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

As used herein, the term "mobile device" refers to a mobile phone or tablet capable of executing locally stored applications and supporting wireless bi-directional communication and data transfer via the Internet or the public telecommunications infrastructure. Mobile devices include, for example, IPHONES (available from Apple Inc., Cupertino, Calif.), BLACKBERRIES (available from RIM, Waterloo, Ontario, Canada), or any mobile phones equipped with the ANDROID platform (available from Google Inc., Mountain View, Calif.); tablets, such as the IPAD and KINDLE FIRE; and personal digital assistants (PDAs). The bi-directional communication and data transfer can take place via, for example, one or more of cellular telecommunication, a Wi-Fi LAN, a point-to-point Bluetooth connection, and/or an NFC communication.

Mobile devices, e.g., smart phones, are in general uniquely associated with a specific user, and therefore may act as an authentication token for identifying the user. For example, an authentication server may have (or have access to) a database associating smart-phone identifiers, smart-phone users, and privilege levels for those users. The authentication server also implements access policies, as described below, which may vary among users and the secured resources.

Figure 1:
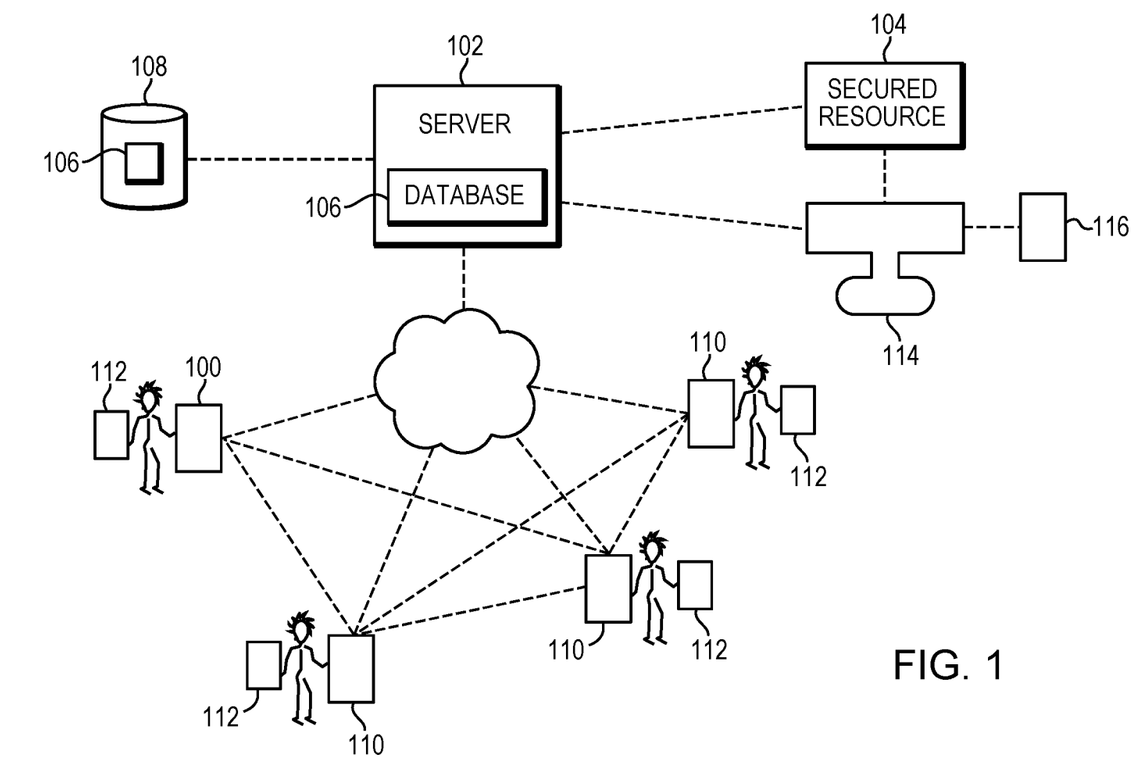
FIG. 1 schematically illustrates communications between mobile devices, a secured source, and an authentication server in accordance with an embodiment of the invention.

FIG. 1 depicts an authentication server 102 granting one or more groups of users access to a secured resource (e.g., a device, a network, and/or a database) 104 based on a quorum scheme and access policies associated with the quorum scheme and/or the secured resource 104. A quorum is defined as a minimum number of users in a group necessary to achieve a successful transaction (in this case authentication). In various embodiments, the access policies define one or more groups of users entitled to access the secured resource 104; each secured resource 104 may have different access policies that require different numbers and/or different ranking-levels of quorum-related users. The access policies are stored in a database 106 implemented in the authentication server 102 or in an external storage system 108 to which the server 102 has access (e.g., via a wired or wireless network connection). The quorum-related users may be identified by, for example, their mobile devices 110 and/or personal tags 112, which a user may wear and which communicate identifying information to a reader; for example, the tags 112 may be transponders responsive to NFC signals or may contain an optically readable barcode. The authentication database 106 may store user records each of which specifies the user's identity as well as the identifying information encoded on that user's mobile device 110 and/or personal tag 112.

Figure 2A:
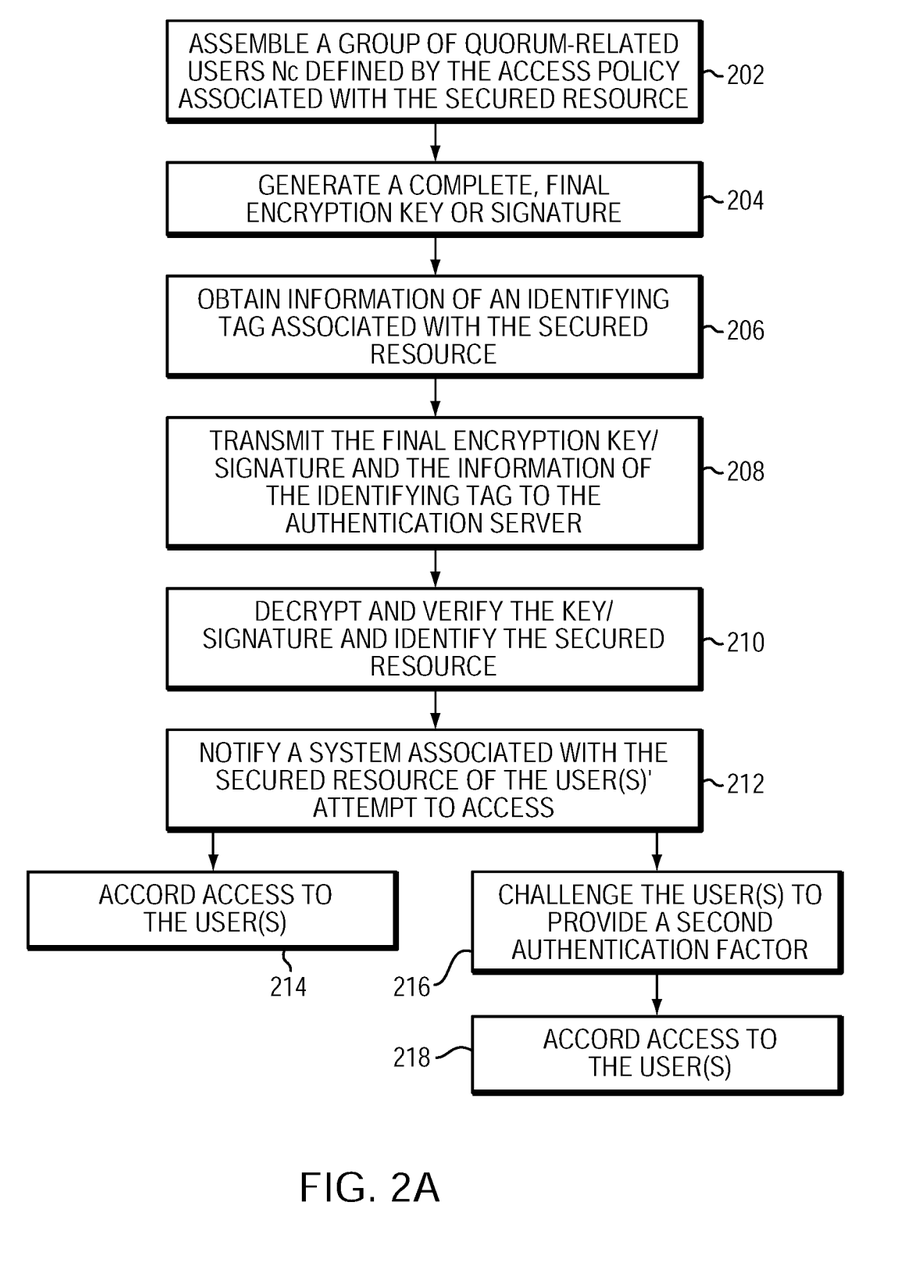
FIG. 2A depicts a representative procedure for granting access to the secured source in accordance with an embodiment of the invention.

Referring to FIG. 2A, in some embodiments, the access-granting process of the secured resource 104 is initialized by assembling a group of quorum-related users defined by the access policy associated with the secured resource 104 (step 202). The users in the quorum-related group can be identified and gathered using the mobile devices 110 they own or use via a two-way communication system, such as a local area network or a wireless data transmission system; as a result, the identified and gathered users may be physically present at the same location or distributed among different geographical locations for the purpose of authentication. For example, the presence of a necessary participant somewhere within the institution, rather than in the immediate vicinity of the access-seeking user, may suffice.

For purposes of discussion, the users are assumed to hold mobile devices capable of NFC communication in a proximate geographical location (e.g., the same room); every NFC-capable mobile device 110 is defined as an NFC node. It should be understood, however, that quorum authentication using NFC is discussed herein only as an example; the communication mode is not critical to the invention. Participants may communicate with the server 102 via any of NFC, a wireless telephone connection, a wired or wireless WAN or LAN connection, etc., and utilize the same or different modes of communication.

In one embodiment, every NFC node is assigned a key; a collection of a certain minimum number of keys Nc from the users is necessary to "commit"—i.e., to achieve a successful transaction, namely, satisfying the quorum-based authentication policy stored in the database 106. Assuming the total number of nodes (or users) in the quorum group is K, Nc is equal to or less than K; typically, Nc is larger than K/2 (i.e., the majority of the group members K). In one embodiment, assembling or integrating the collection of Nc keys (or NFC nodes) dynamically generates one new and final key associated with the quorum group Nc (step 204); this can be accomplished using conventional encryption techniques. Because the policy requires at least Nc nodes to grant access to the secured resource 104, each NFC node may simply obtain keys through interactions with other NFC nodes and compile them to obtain the final key. Alternatively, there may be no encryption keys distributed in the NFC nodes. Rather, when two or more NFC nodes encounter one another, the mutual detection of NFC signals activates or "wakes up" an application stored on each node to create one or more encryption keys. In some embodiments, one of the NFC nodes (e.g., any one of the user mobile devices 110) must also obtain information identifying a computer system 114 (e.g., the computer system's IP or MAC address, or hostname) capable of according access to the secured resource 104—which may be an application running on the device 114, for example—via an identifying tag 116 attached to the device 114 (step 206). The NFC node then transmits this identifier information together with the newly generated final key to the authentication server 102 (e.g., via cellular communication) (step 208). In other words, in this embodiment, authentication requires not just assembly of a quorum, but also interaction with a tag attached to a particular physical device. Upon receiving and decrypting the newly generated key and matching the decrypted information (and, if applicable, the obtained tag information) with a security policy associated with the identified secured resource 104, the authentication server 102 may determine whether one or more users gathered in the quorum group are authorized to access the requested secured resource 104 (step 210). Access may be accorded to the users via their mobile devices or, depending on the access policy, via the device 114.

The server 102 may employ any of several different methods for according access. In one embodiment, using the identified IP address of the computer system 114, the server 102 directly notifies a running security process (hereafter the "agent") thereon that the user(s) is attempting to log in to the secured resource 104 and has presented a satisfactory authentication factor (i.e., the newly generated key) (step 212). The agent may or may not exist as a process running on the system 114 prior to the authentication process. For example, the computer system 114 may retrieve (e.g., from the server 102) an agent program that communicates with the server 102. Upon receiving the information from the server 102, the now-running agent on the computer system 114 can then grant the user(s) access to the secured resource 104 (step 214). In another embodiment, the authentication server 102 provides the mobile device 110 with an appropriate credential (e.g., a secure token) indicating that the quorum-related user(s) has been successfully authenticated. The mobile device 110 then passes this credential to the computer system 114 via, for example, NFC or point-to-point Bluetooth communications; the computer system 114 thereupon grants the user(s) access to the secured resource 104. If a higher level of security is appropriate, the agent may further challenge the user(s) to provide a second authentication factor (e.g., a PIN, password, or fingerprint) (step 216). Once the user(s) successfully presents the second authentication factor, the agent completes the authentication process and grants the user(s) access to the secured resource 104 (step 218).

Figure 2B:
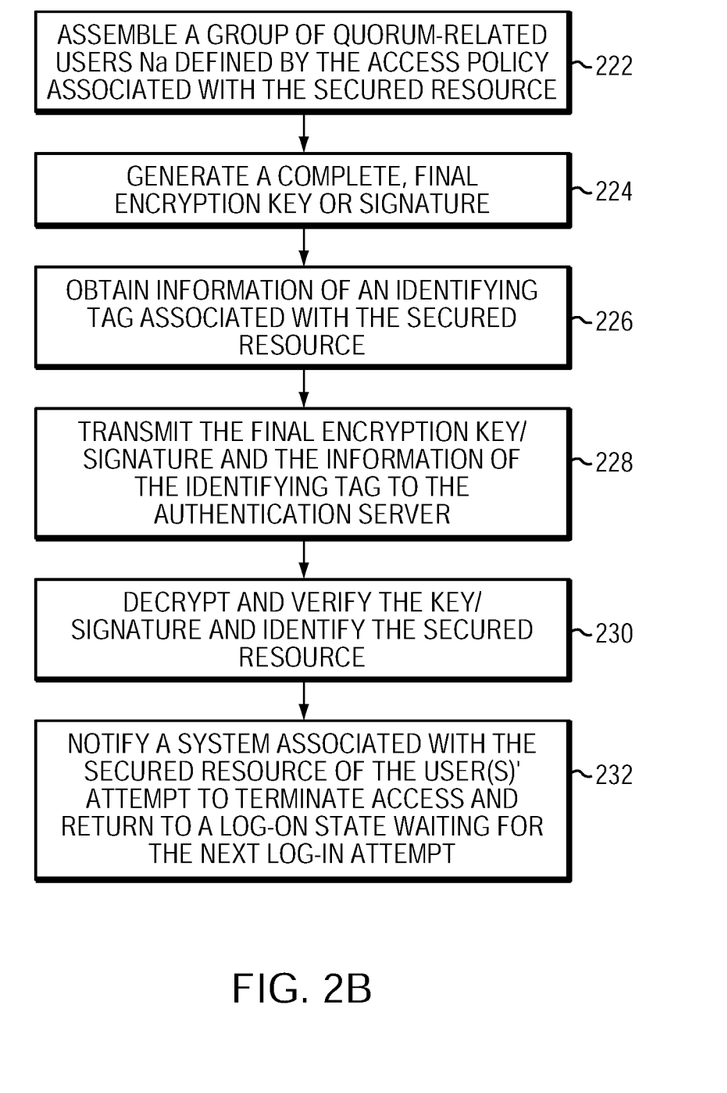
FIG. 2B depicts a representative procedure for terminating access to the secured resource in accordance with an embodiment of the invention.

Termination of access at an appropriate time is crucial for protecting the secured resource 104 from unauthorized intrusions. Referring to FIG. 2B, like the authentication process, a collection of a certain number Na of keys from the quorum-related users may be necessary to "abort" the already-committed transaction. Again, although Na is typically larger than K/2, Na may be equal to or less than K. In addition, the sum of Nc and Na may exceed K. In various embodiments, termination of access begins with assembling a group of quorum-related users (or Na keys) defined by the termination policy associated with the secured resource 104 (step 222). When the Na keys are assembled, a final, complete key is dynamically generated (step 224). One of the users' mobile devices 110, again, may transmit the newly generated complete key to the authentication server 102 together with information identifying the secured resource 104 (steps 226, 228). Upon receiving and decrypting the key and determining information decrypted therein satisfying the security policy associated with the identified secured resource 104 (step 230), the authentication server 102 may request the agent running on the computer system 114 to terminate access to the secured resource 104 and return to a log-on state, waiting for the next log-in attempt (step 232).

Although embodiments described herein focus on encryption keys that can be distributed to the quorum members, it should be understood that any identifiers that can identify each quorum member and are readable (by RF, optically, or otherwise) by a mobile device 110 are within the scope of the present invention. In addition, the policy for access to the secured resource 104 may be the same for members of a quorum, or may be different for different members; accordingly, the key assigned to an NFC node associated with one of the quorum members may be the same or different from that assigned to a different quorum member. For example, the policy may require a larger number of low-ranking employees than high-ranking employees when authenticating the secured resource 104. To accomplish this, the low-ranking employees may hold keys of a shorter length than those of the high-ranking employees; as a result, the shorter key length requires more keys to be used to assemble a complete, final key and access the secured resource 104. Alternatively, the policy may require an equal number of employees from every ranking level to participate in the authentication process; each employee, regardless of her ranking, may hold keys of the same length.

In addition, the policy controlling access to the secured resource 104 may be updated regularly or otherwise. In some embodiments, upon updating the policy, the authentication server 102 generates a new key, splits it, and transmits the newly split keys to a new quorum based on the new policy and the user identification stored therein. The authentication server 102 may later accord access to the secured resource 104 when a new private key generated from a collection of the newly split keys from the new quorum is presented.

Further, the policy may or may not require the quorum to be established in a particular order. Thus, a quorum may be order-independent as described above, simply requiring Nc group members (or a fraction of the total group membership equal to or greater than Nc/K) to participate in authentication in any order. In order-dependent implementations, however, the users are required to be sufficient in number Nc and to participate in authentication in accordance with any order specified in the access policy. An order can be specified across the quorum group (e.g., each member is assigned a number, and the users must participate in numerically ascending order—user 1, then user 2, etc.); or can be pairwise (i.e., each user knows whom to contact next); or can be dynamically determined by the authentication server 102 on a transactional basis (e.g., after user 1 initiates the sequence, the server requests participation by user 3, etc.).

Figure 3:
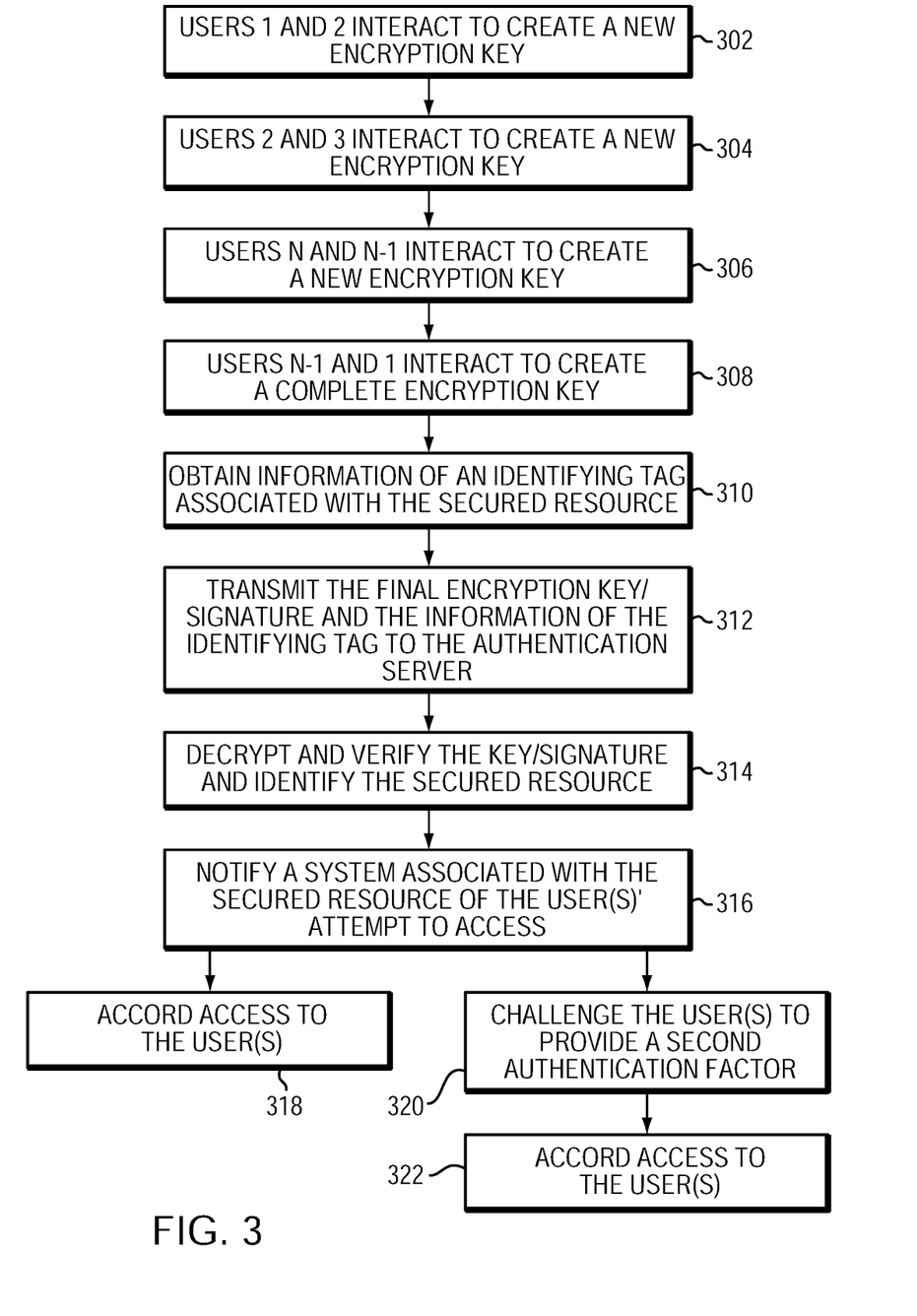
FIG. 3 depicts another representative procedure for according access to the secured resource in accordance with another embodiment of the invention.

Referring to FIG. 3, in various embodiments, a group of users satisfying the quorum requirement is first established based on the access policy stored in the database 106 of the authentication server 102 or the server accessible external storage system 108. In one exemplary implementation, the policy requires each quorum-related authentication activity to be a pairwise NFC interaction between NFC nodes (or quorum-related members), and the sequence of interactions occurs in a predetermined order. For example, users 1 and 2 first bring their NFC nodes into NFC range, and the nodes interact—i.e., they activate or generate a unique encryption key needed in the next step of the sequence (step 302). This is accomplished by means of applications ("apps") stored on the NFC nodes, which can be activated by the user or which "wake up" when another NFC node is detected. Encryption-key activation/generation may occur in various ways. In one approach, the users split a quorum private key so that for each pairwise "meeting" (i.e., interaction between NFC nodes), a number equal or related to the private key for that meeting is produced when the split keys are combined. In some embodiments, there is no split partial encryption key; numbers identifying the respective NFC nodes are stored thereon, and when one NFC node encounters another, they exchange identifiers. These identifiers may be integrated to create a signature that can be recognized by the authentication server 102. In addition, the identifiers and/or created signature may or may not be encrypted prior to an NFC node communication with the authentication server 102.

Once the communication between NFC nodes of users 1 and 2 has been established, the NFC node of user 2 encounters the next proper NFC node in the sequence (e.g., user 3) based on the policy, and the process repeats (step 304). This continues until the final encounter in the sequence (i.e., between user n—1 and user n) has occurred (step 306). At this point, the NFC nodes of user n and user 1 are brought into NFC proximity and interact, so that the NFC node of user 1 receives the final, complete encryption key from user n (step 308). In another embodiment, the final encryption key is completed after the NFC communication between user n —1 and user n. Any user(s) in the quorum (i.e., user 1 to user n) is now in a position to authenticate to the server 102.

Generally, prior to communicating with the server 102, any of the users 1 through n may bring her NFC node into proximity with the identifying tag 116, which is typically (although not necessarily) physically associated with a computer system 114 that will accord access to the secured resource 104 (step 310). For example, the identifying tag 116 may be an RFID tag that can be read and/or decoded by the NFC node within the RF activation range. Upon obtaining the information contained in the RFID tag, the computer system 114 can be identified.

The NFC node of any of the users 1 through n now may transmit the identification information of the computer system 114 together with the final, complete encryption key to the authentication server 102 using, for example, wireless cell phone communication or other suitable modality (e.g., a Wi-Fi LAN) (step 312). The server 102 uses the tag information to identify the computer 114 (e.g., the computer's IP or MAC address, or hostname) from a database record generated when the tag was initially assigned to the computer 114. Similarly, a user holding the NFC node can be identified by reference to the authentication record in the database 106, which record was generated when the mobile device 110 was initially assigned or bound to the user. In various embodiments, the server 102 then retrieves the appropriate decryption key based on the identified tag information (step 314), and if the received encryption key is properly decrypted using the retrieved key—indicating that the quorum interaction sequence was successfully executed—the server 102 communicates with the tagged computer 114; in particular, the server 102 directly notifies the agent on the computer 114 that one or more of the group of quorum-related users are trying to log in to the secured resource 104 and have completed the quorum authentication procedure (step 316). The agent can either grant access directly (step 318) or require further authentication (e.g., a password) from the user(s) (step 320), following which the agent grants the user(s) access to the secured resource (step 322). In various embodiments, termination may utilize a procedure similar to that of the log-in process as described above.

Accordingly, in various embodiments of the invention, the authentication is performed by the quorum—that is, the quorum assembles and interacts using NFC communications via NFC nodes, and the sequence of interactions can be captured if relevant to the access policy. The result is similar to a "virtual mantrap" for authentication, and the manner in which this occurs can vary depending on the application and design preferences.

In accordance with some security policies implemented by the server 102, it is necessary for a specific group of personnel (e.g., one expert from each group) to participate in an activity. Such policies may require a quorum consisting of one member from each group. If any member in each group is considered to be equally qualified, a same encryption key may be assigned to every member in the same group; different groups may have different encryption keys. For example, suppose the policy of accessing an operating room requires a quorum including a surgeon, an anesthesiologist, a nurse, and an assistant. The authentication server 102 accords access to the room only after a final, complete encryption key/signature is created from NFC nodes of all necessary participants—i.e., individuals collectively satisfying the required set of clinical roles for the procedure—regardless of each individual's personal identity. This approach therefore flexibly allows the server 102 to grant access to a quorum having any particular combination of personnel, yet may be used to enforce the presence of an entire team before a procedure may commence.

The encryption keys described above can be generated using standard key-generation techniques. Keys can be randomly generated, for example, using a random number generator (RNG) or pseudorandom number generator (PRNG). A key can also be created using a passphrase and a key-generation algorithm using a cryptographic hash (e.g., SHA-1). Because the simplest method to read or "hack" encrypted data is a brute force attack—simply attempting every number, up to the maximum length of the key—it is important to use a sufficiently long key length; longer keys take exponentially longer to attack, rendering a brute force attack impractical. Currently, key lengths of 128 bits (for symmetric key algorithms) and 1024 bits (for public-key algorithms) are common.

The various authentication and communication routines described above may be implemented, on the server 102 and in the mobile device 114, by computer-executable instructions, such as program modules, that are executed by a conventional computer processor. Generally, program modules include routines, programs, objects, components, data structures, etc. that performs particular tasks or implement particular abstract data types. Those skilled in the art will appreciate that the server 102 may be implemented using any of various computer system configurations, including multiprocessor systems, microprocessor-based or programmable consumer electronics, minicomputers, mainframe computers, and the like. The server 102 may also be realized in distributed computing environments where tasks are performed by remote processing nodes linked through a communications network. In a distributed computing environment, program modules may be located in both local and remote computer-storage media including memory storage devices.

Figure 4:
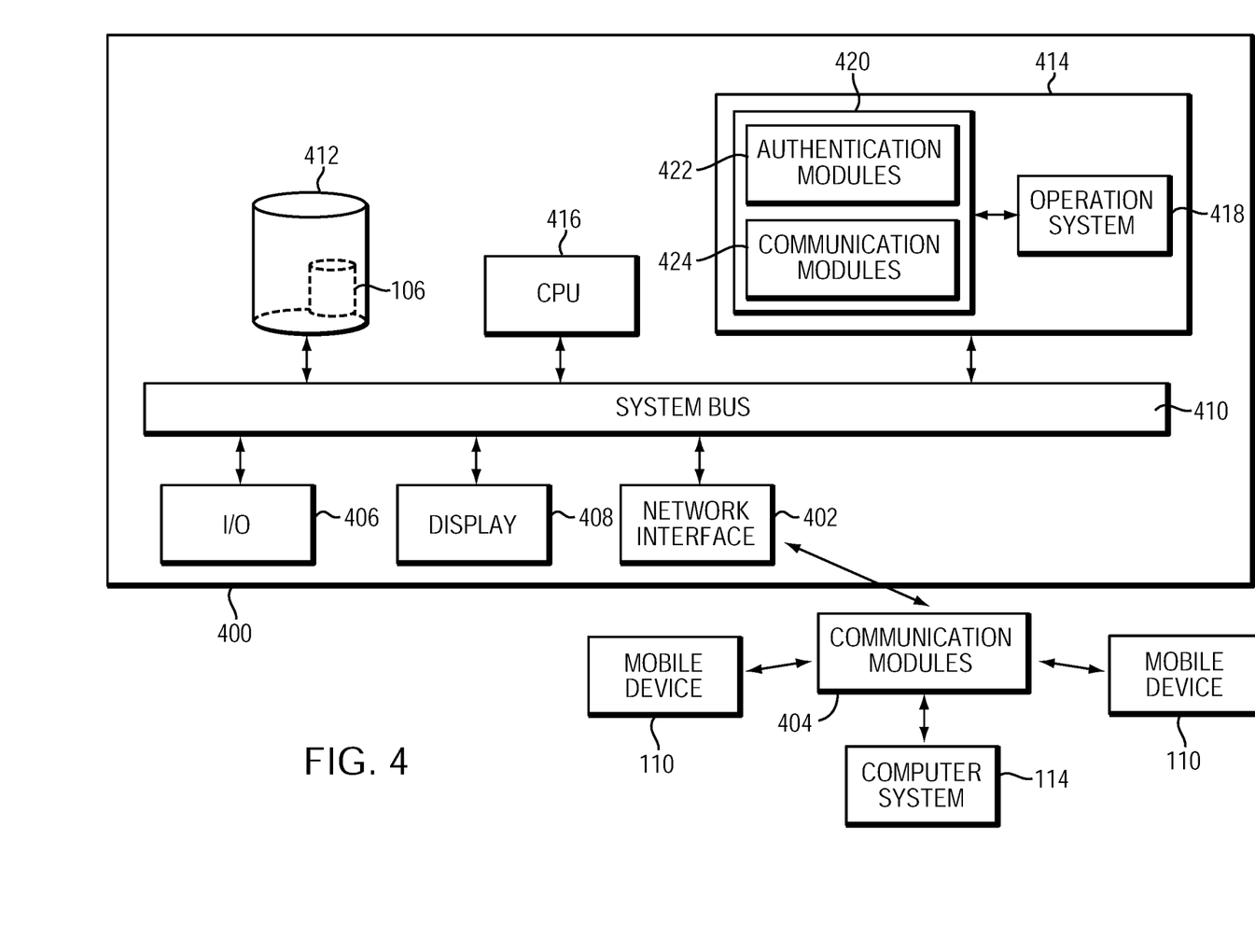
FIG. 4 is a block diagram of a system for authenticating a secured resource in accordance with an embodiment of the invention.

Thus, referring to FIG. 4, the server 102 may comprise or consist of a general-purpose computing device in the form of a computer 400 including a network interface 402, which interacts with the mobile devices 110 via communication hardware 404. The computer 400 also includes input/output devices 406 (e.g., a keyboard, a mouse or other position-sensing device, etc.), by means of which a user can interact with the system 400, and a screen display 408. The computer 400 further includes a bi-directional system bus 410, over which the system components communicate, a non-volatile mass storage device (such as one or more hard disks and/or optical storage units) 412, which can contain one or more databases 106 storing various policies associated with the secured resources 104 and users' identifications, and a main (typically volatile) system memory 414. The operation of computer 400 is directed by a central-processing unit ("CPU") 416.

The main memory 414 contains instructions, conceptually illustrated as a group of modules, that control the operation of CPU 416 and its interaction with the other hardware components. An operating system 418 directs the execution of low-level, basic system functions such as memory allocation, file management and operation of mass storage devices 412. The operating system 418 may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

At a higher level, a service application 420, which integrates an authentication module 422 with a communication module 424, carries out the authentication process of the invention. More specifically, the system may first obtain the final, complete key from the mobile devices 110 used by the quorum via the communication module 234; the authentication module 422 then directly decrypt the received key or retrieve an appropriate decryption key to properly decrypt the received key to obtain the user identification and/or quorum interaction sequence. The system 400 may communicate the authentication result with the agent on the computer system 114 via, again, the communication hardware 404. In various embodiments, the communication module 424 is a conventional component (e.g., a network interface or transceiver) designed to provide communications with a network, such as the Internet and/or any other land-based or wireless telecommunications network or system, and, through the network, with the mobile devices 110 and the computer system 114. The authentication module 422 and communication module 424 may be stored within main memory 414 and/or in the mass storage device 412, e.g., within the database 106.

Any suitable programming language may be used to implement without undue experimentation the analytical functions described above on the authentication server 102, the mobile devices 110, and the secured resources 104. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The authentication server 102 and database 106, the mobile devices 110, and the secured resource 104 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing units that execute commands and instructions may be general-purpose processors, but may utilize any of a wide variety of other technologies including special-purpose hardware, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of controlling access to a resource in accordance with a predefined, electronically stored quorum-based authentication policy, the method comprising:
    computationally generating a final key satisfying the authentication policy;
    splitting the final key into at least three keys; and
    transmitting each of the at least three keys to a different electronic device associated with a user thereof, the at least three devices (i) not including the resource and (ii) constituting a quorum in accordance with the authentication policy, whereby electronic interaction among the at least three devices produces the final key.

2. The method of claim 1, wherein the authentication policy specifies an order in which the at least three keys are assemblable into the final key.

3. The method of claim 1, wherein the final key is an encryption key.

4. The method of claim 1, wherein the devices comprise NFC nodes.

5. The method of claim 1, wherein the final key is computationally generated by an authentication server.

6. The method of claim 1, wherein the final key is computationally generated in response to an update to the authentication policy.

7. A method of terminating access to a resource in accordance with a predefined, electronically stored quorum-based authentication policy, the method comprising:
    causing electronic interaction among at least three devices each associated with a user thereof, the at least three interacting devices (i) not including the resource and (ii) constituting a quorum in accordance with the authentication policy, each of the devices contributing a key to another of the devices whereby a final key is produced and contains all of the contributed keys in an order specified by the authentication policy;
    computationally determining whether the final key satisfies the authentication policy; and
    when the final key satisfies the authentication policy, terminating any previously granted access to the resource.

8. The method of claim 7, further comprising, prior to the electronic interaction among the at least three devices, electronically granting access to the resource to at least one of the users and/or at least one of the devices.

9. The method of claim 7, wherein the interaction comprises NFC interaction and the devices comprise NFC nodes.

10. The method of claim 7, wherein the computationally determining step is performed by an authentication server and comprises decrypting the final key.

11. The method of claim 7, wherein the final key is an encryption key.

12. The method of claim 7, further comprising identifying the resource using information transmitted from at least one of the interacting devices.

13. The method of claim 7, wherein the interaction is performed in a sequence of pairwise communications among the devices.

14. The method of claim 7, wherein the keys contributed by each of the devices to produce the final key are not stored on the devices prior to the electronic interaction among the devices.

15. The method of claim 7, wherein the keys contributed by each of the devices to produce the final key are generated on each of the devices only upon the electronic interaction among the devices.

16. The method of claim 7, wherein the keys contributed by each of the devices to produce the final key are stored on the devices prior to the electronic interaction among the devices.

* * * * *